United States Patent [19]

Ichimi

[11] 4,059,290
[45] Nov. 22, 1977

[54] JOINT FOR CONNECTION OF GAS COCK TO METAL PIPE

[76] Inventor: Hideo Ichimi, No. 33, Aza-Idogo, Ohaza-Tomiyoshishinden, Kiracho Hazu, Aichi, Japan

[21] Appl. No.: 633,337

[22] Filed: Nov. 19, 1975

[30] Foreign Application Priority Data

Dec. 4, 1974  Japan ............................ 49-147230[U]

[51] Int. Cl.² ........................ F16L 19/00; F16L 55/00
[52] U.S. Cl. ..................................... 285/169; 285/318; 285/354; 285/DIG. 4
[58] Field of Search ......... 285/244, 318, 248, DIG. 4, 285/382.7, 348, 354, 334.4, 169

[56] References Cited

U.S. PATENT DOCUMENTS

| | | | |
|---|---|---|---|
| 2,143,568 | 1/1939 | Munro | 285/354 X |
| 2,211,978 | 8/1940 | Joseph | 285/248 |
| 2,323,912 | 7/1943 | Johnson | 285/348 X |
| 2,503,169 | 4/1950 | Phillips | 285/348 X |
| 2,698,191 | 12/1954 | Samiran | 285/248 |
| 3,459,443 | 8/1969 | Butters et al. | 285/318 X |
| 3,653,691 | 4/1972 | Bram | 285/318 X |

Primary Examiner—Thomas F. Callaghan
Attorney, Agent, or Firm—Fred Philpitt

[57] ABSTRACT

A joint is constructed in such a way that threads are formed on outer peripheries of both ends of a connection cylinder, and one of the threads of the connection cylinder is screwed with a cap nut for connection to a hose fitting of the gas cock, and the other thread is screwed to a coupling provided at the tip of the metal pipe for connection to a gas equipment and said cap nut is provided with a clamping means for coupling and pressure gastight fitting of the hose fitting of the gas cock to a connection cylinder, and this clamping means is constructed in such a way that a volute spring is mounted on the inside of the cap nut, and the connection cylinder is firmly and positively connected to the hose fitting of the gas cock to be used for fitting the rubber hose.

1 Claim, 2 Drawing Figures

JOINT FOR CONNECTION OF GAS COCK TO METAL PIPE

RELATED APPLICATION

The present invention is an improvement of an invention related to "Joint for Connection of Gas Cock to Metal Pipe" applied for a patent for copending application in the U.S. Patent Office on Sept. 15, 1975 by Hideo Ichimi which was given Ser. No. 613,591 and now abandoned.

BACKGROUND OF THE INVENTION

The present invention relates to a joint for connection of a metal pipe to gas cock, and more particularly to a joint capable of connecting the metal pipe to a hose fitting of a conventional (old type) gas cock used for fitting the rubber hose.

Heretofore, the gas cock and the gas equipment such as gas range, gas space heater, etc. have been connected to the rubber hose. However, the rubber hose deteriorates in about one year's use and it tends to cause cracks and said cracks tend to give a rise to gas leakage, and also the external pulling force, for example, the force caused by a person who stumbles over the gas hose is applied, the hose is easily pulled out from the hose fitting of the gas cock which also gives a rise to a serious accident.

Under the foregoing circumstances, in recent years, as the pipe for connection of the gas equipment and the gas cock, the metal pipe has become a standard material instead of the rubber hose.

In order to use the metal pipe provided with a coupling at its tip portion, the gas cock of new model adapted for screwing of the coupling is required to be used.

However, in old houses where old type gas cocks with hose fittings are still used, and the hose fitting of the gas cock is formed with several stripes of constricted portions on its outer periphery, and said portions being convenient for gastight connection of the rubber hose to the hose fitting, and therefore it is impossible to connect the coupling of the metal pipe to the hose fitting of the old type gas cock from its structural standpoint. As a result, in the houses where old type gas cocks are installed, the household is compelled to use the rubber hose.

The applicant developed a joint which is capable of connecting the metal pipe to the gas cock of conventional type which is used for fitting the rubber hose in the prior art, but this joint employs rubber or soft material made of synthetic resin in the clamping means for connection of the gas cock of conventional type to the joint, and as a result, this soft material has not only poor clamping force against the hose fitting of the gas cock but also has short service life due to poor durability.

SUMMARY OF THE INVENTION

An object of the present invention is to provide a joint for connection of a metal pipe to a gas cock of old type adapted for connection to a rubber hose.

An another object of the present invention is to provide a joint that can be simply installed and in extremely firm condition by utilizing several stripes of constructed portions formed on the outer periphery of the hose fitting of the gas cock without changing the shape of the old type gas cock.

A still another object of the present invention is to provide a joint provided with a clamping means in which a cap nut is screwed to one end of a connection cylinder and the cap nut is inserted and positioned to the hose fitting of the old type gas cock, and when the connection cylinder is screwed into the cap nut, the cap and the connection cylinder are pressure contacted to the hose fitting.

Furthermore, an object of the present invention is to provide a joint in which a clamping means of the joint employs a volute spring instead of a soft material made of rubber or synthetic resin, and as a result it provided remarkable clamping force and durability as compared with those of the soft material, and a metal pipe can be more firmly and positively connected to the gas cock of conventional type.

DETAILED DESCRIPTION OF THE INVENTION

Figure 1:
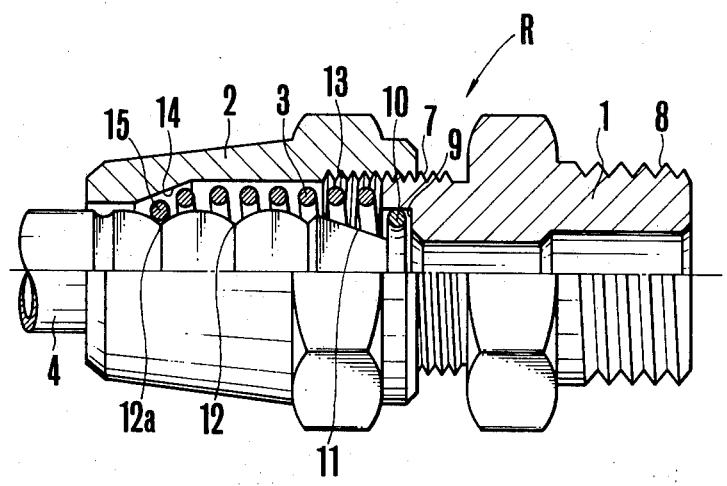
FIG. 1 is a cross sectional view of a joint according to the present invention and FIG. 2 is a partial cross sectional view showing the connected condition of the old type gas cock and the metal pipe by using the joint of the present invention.

The joint according to the present invention is represented by ordinary letter R, and is formed by a combination of a connection cylinder 1 and a cap nut screwed to one end side of the connection cylinder 1 and a volute spring 3 and said cap nut 2 is provided with a clamping means for firmly clamping of the connection cylinder 1 to the hose fitting 4 of the old type gas cock G employed for fitting the rubber hose, and the other end of the connection cylinder 1 is screwed with a coupling 6 provided with a metal pipe 5 at its tip portion.

The connection cylinder 1 forming the joint R is formed as a connection cylinder formed with threads 7 and 8 on the external peripheries of both end portions, and the cap nut 2 is screwed to the thread 7 of one end of the connection cylinder 1. The other thread 8 of the other end of the connection cylinder 1 is screwed with the coupling 6 of the metal pipe 4.

An annular stepped portion 9 is formed on the inner periphery of an opening end of the cap nut 2 of the side that is screwed to the connection cylinder 1, and an O ring 10 is fitted on the stepped portion 9, and when the cap nut 2 is inserted and is positioned at the hose fitting 4 of the gas cock G and the connection cylinder 1 is screwed to the cap nut 2, the O ring 10 is urged against the tapered outer peripheral surface 11 formed at the tip of the hose fitting 4 of the gas cock G whereby the sealing is established between the cap nut 2 and the gas cock G.

Also, as a means for sealing the connection cylinder 1 to the hose fitting of the gas cock G, a technical means of a prior art of causing both the metal surfaces to contact without using the O ring to obtain the sealing may be employed for the prevention of the gas leakage.

The cap nut 2 provided with a clamping means which forms the joint R is inserted and positioned at the hose fitting 4 of the gas cock G and when the connection cylinder 1 is screwed into the cap nut 2, the cap nut 2 is firmly clamped to the hose fitting 4. The gas cock G to which the cap nut 2 of the joint R of the present invention is fitted is of the old type for use in fitting the rubber hose, and the outer periphery of the hose fitting 4 is formed with several stripes of constricted portions 12.

The clamping means set forth in the foregoing is formed in such a way that a thread 13 is formed to screw a connection cylinder of the cap nut 2 and a tapered surface 14 is formed on the inner periphery of the opposed end portion of the cap nut 2 to provide an opening of small diameter sufficient to allow insertion of a hose fitting 4 of the gas cock G, and in the condition where the cap nut 2 is inserted and is positioned at the hose fitting 4 of the gas cock G, a volute spring 3 is thrusted into the innermost portion of the cap nut 2 towards the hose fitting 4, and a small diameter portion 15 formed at the tip of the volute spring 3 is caused to fit on the constricted portion 12a of the base end portion of the hose fitting 4 whereby the volute spring 3 is engaged on the inside of the one end of the cap nut 2. When the connection cylinder 1 is screwed to the cap nut 2, the volute spring 3 is compressed, and the connection cylinder 1 is pushed outwards of the hose fitting 4 by the resilient force of the volute spring 3. Simultaneously, the cap nut 2 screwed to the connection cylinder 1 is jointly pulled outwards of the hose fitting 4. And the small diameter portion 15 and its peripheral portion of the volute spring 3 engaged on the constricted portion 12a of the base end portion of the hose fitting 4 are urged against the tapered surface 14 of the cap nut 2 in such a way that the portions are sandwiched by the inclined surface formed continuously on the constricted portion 12a, and the small diameter portion 15 of the volute spring 3 is prevented from being pulled out by the constricted portion 12a of the base end portion of the hose fitting 4, and is thus firmly and positively engaged therewith. As described in the foregoing, the joint R can be completely prevented from being pulled out from the hose fitting 4 of the gas cock G.

Figure 2:
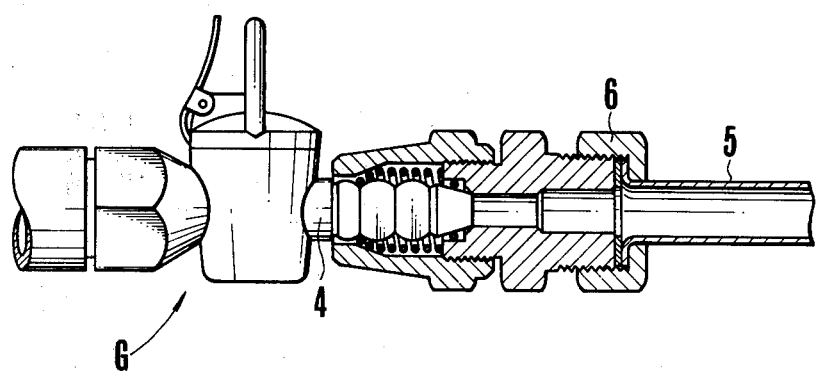

Accordingly, the present invention provides an effect that in order to fit the joint R into the hose fitting 4 of the gas cock G of the old type, screw the connection cylinder 1 to the cap nut 2 and causes the O ring 10 to urge against the tapered outer periphery 11 formed at the tip of the hose fitting 4 and to seal the space as shown in FIG. 2. Thus the cap nut 2 is strongly pulled towards the side of the connection cylinder 1 by the resilient force of the volute spring 3, and the small diameter portion 15 of the tip of the volute spring 3 and its peripheral portion are urged against the constricted portion 12a of the stem of the hose fitting 4, and this sandwiched condition is maintained.

As a result, the tip of the hose fitting 4 and the inside of the tip of the connection cylinder 1 can be positively and firmly connected, and at the same time, the volute spring 3 itself is caused to fit on the hose fitting by its resilient force which brings about a remarkable effect of preventing the pull-out and thus the joint R can be positively and firmly connected to the gas cock G of the conventional type.

What is claimed is:

1. A joint assembly for connecting a metal pipe to a gas cock comprising in combination
   1. a connection cylinder having a mid portion, a right end portion, a left end portion and an open passageway extending centrally therethrough,
      a. said right end portion being externally threaded, and
      b. said left end portion
         having an externally threaded surface, and
         having an annular stepped portion located between said open passageway and said externally threaded surface,
   2. a cap nut
      having an open passageway therethrough,
      having a right end portion that is internally threaded and which engages the externally threaded left hand portion of said connection cylinder, and
      having an inwardly tapered surface towards the left end of said cap nut
   3. a gas cock hose fitting extending through the left end of said cap nut and inwardly thereof to a point adjacent to the left end of said connection cylinder, said gas cock hose fitting having a plurality of annular preformed constrictions and an externally tapered end portion,
   4. a volute spring positioned between the exterior of said gas cock hose fitting and the interior of said cap nut, and
   5. an O-ring disposed between the exterior inner end of said gas cock hose fitting and the said annular stepped portion of said connection cylinder, said O-ring engaging said externally tapered end portion of said gas cock hose fitting, whereby, when the externally threaded left hand portion of said connection cylinder and the internally threaded portion of said cap nut are screwed together the left end of the volute spring seats in a constricted portion of said hose fitting to thereby keep the fitting from being pulled to the left and the right end of the gas cock hose fitting abuts against the left end of said connection cylinder in a sealing relationship with the aid of said O-ring.

* * * * *